March 5, 1963  E. MÜLLER  3,080,051
EXTRUSION APPARATUS
Filed Oct. 9, 1956
Fig. 1
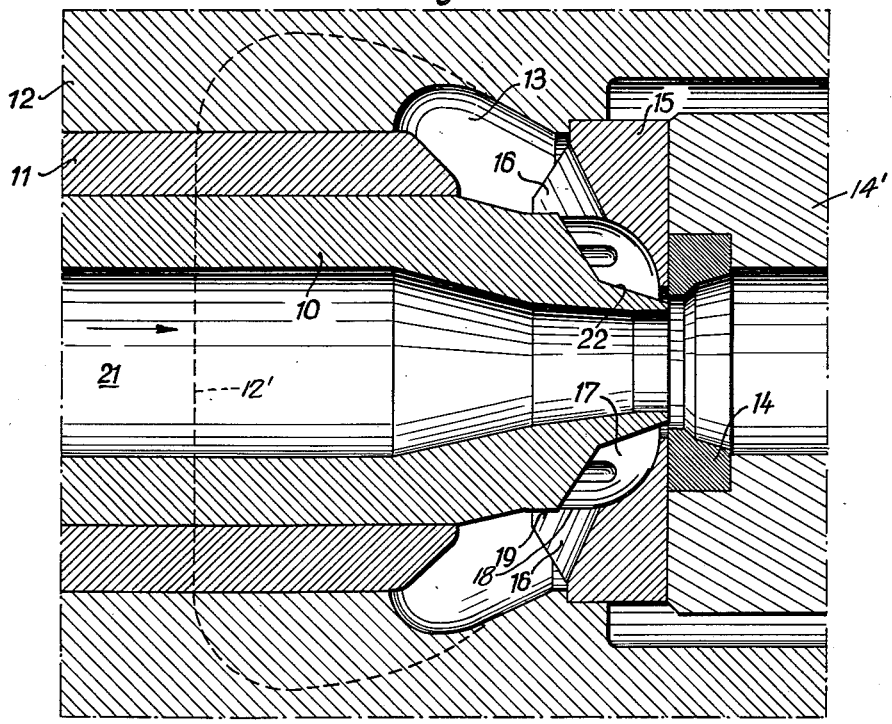
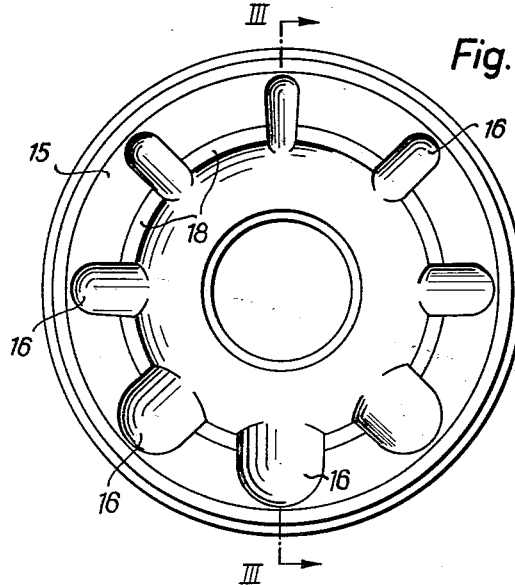
Fig. 2
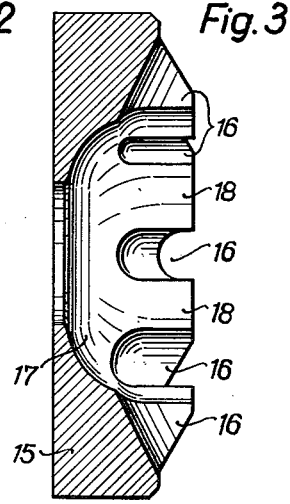
Fig. 3
INVENTOR
Ernst Müller
by: Michael S. Striker
Att.

United States Patent Office 3,080,051
Patented Mar. 5, 1963

3,080,051
EXTRUSION APPARATUS
Ernst Müller, Duisburg, Germany, assignor to Firma
Demag Aktiengesellschaft, Duisburg, Germany
Filed Oct. 9, 1956, Ser. No. 614,971
Claims priority, application Germany Oct. 10, 1955
2 Claims. (Cl. 207—17)

The present invention relates to extruding apparatus. More particularly, the present invention relates to extruding apparatus for extruding a metallic sheath on a cable.

For various purposes today, it is desirable to provide a metallic sheath on different types of cables. For example it is well known to use lead covered electrical cables when such cables are to be used in areas wherein the cables are exposed to a certain atmosphere which would destroy the ordinary insulation used on electrical cables. In recent years aluminum has been used for cable sheaths.

In the extrusion apparatus the metal which is to be extruded onto the cable in a seamless fashion is introduced into a supply chamber and the metal flows around the cables to provide a seamless covering. It is usual for the cable to be moved through the extrusion apparatus in a horizontal plane and to introduce the metal to be extruded at an angle to the horizontal plane so that the metal flows around the cable and covers the entire circumference thereof. It is clear that it is desirable to have a uniform thickness in the sheath on the cable around the entire circumference of the cable. It is clear that once the sheath is placed on the cable, it would be difficult to tell from the outside precisely how the thickness of the metal sheath varies around the circumference of the cable. Since the metal is extruded through the extrusion apparatus under very high pressure it tends to flow along the lines of least resistance and thereby follow the shortest path between the supply chamber wherein the metal is supplied and the cable itself.

When aluminum is used for the metallic sheath surrounding the cable, much higher extrusion pressures are necessary than when lead is used as the cable covering. Accordingly, when aluminum is being extruded the aluminum flows in a non-uniform distribution about the cable depending upon the angle at which the aluminum is introduced into the supply chamber with respect to the cable that it is to cover. Therefore it is very difficult to achieve a proper uniform distribution of the extruded sheath about the cable when aluminum or materials requiring such high extruding pressures are used.

The present invention overcomes the disadvantages of the conventional apparatus by providing a throttling member in the path of the extruded material to cause the material to flow in a uniform distribution about the cable being covered.

It is accordingly an object of the present invention to provide a new and improved apparatus which overcomes the disadvantages of the prior art apparatus.

A second object of the present invention is to provide means in the extrusion apparatus which will provide a uniform distribution of the material being extruded about the cable being covered.

Another object of the present invention is to provide an apparatus which will provide a uniform distribution of a metallic sheath about a cable regardless of the angle with which the extruded material is introduced into the supply chamber with respect to the cable being covered.

Still another object of the present invention is to provide a new and improved extrusion apparatus wherein a plurality of passageways are arranged in the path of the material being extruded to regulate the flow of the extruded material as it passes through the die member.

With the above object in view the present invention mainly consists of an extrusion apparatus including a housing formed with a supply chamber adapted to be connected to a source of material to be extruded, extruding die means arranged in the housing, core means arranged in the housing, and means arranged in the housing between the die means and the core means for providing a uniform distribution of the material extruded about the core means regardless of the angle at which the extruded material is laterally introduced into the supply chamber with respect to the core means.

In a preferred embodiment of the present invention the means for providing a uniform distribution includes a radially grooved and detachable annular shaped disc member which forms with the core of the extrusion apparatus a plurality of passageway of respectively different cross-sections for controlling the flow of the extruded material from a lateral material inlet to the die means so that the same is uniformly distributed about the core means in the area adjacent to the die means.

In addition, this embodiment of the present invention comprises an antechamber between the supply chamber and the die means so as to establish a circumferential connection between said passageways at their respective delivery ends so that the material which has been transmitted through the various passageways in separate streams merges and combines to a uniform stream immediately before and as it passes through the died member, the cross-section of areas of said passageways differing respectively in such a manner that the cross-section area is the greatest where the flow path from the lateral material inlet to the die means is the longest, and is the smallest where said flow path is the shortest.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 1 is a longitudinal horizontal cross sectional bottom view of the die and core portion of the extrusion apparatus constructed in accordance with the principles of the present invention;

FIGURE 2 is a face view of a throttling member constructed in accordance with the principles of the present invention and used in FIGURE 1; and FIGURE 3 is a sectional view taken in a vertical plane along the line III—III of FIGURE 2.

Referring to the drawings it can be seen that the portion of the extrusion apparatus shown includes a tubular housing 12 formed with a supply chamber 13 in the interior thereof. The material to be extruded is introduced into the supply chamber 13 at a lateral inlet which is illustrated in the sectional view of the drawing by the dotted line 12', and may have a flow axis including any desired angle with the axis of the tubular housing.

Arranged axially within the housing 12 is a hollow core 10 which is mounted within a tubular bushing 11. The cable which is to be covered with the metallic sheath upon extrusion thereof is introduced into the interior 21 of the hollow core 10 and moved through the extrusion apparatus in the direction of the arrow.

It can be seen that the forward end of the core 10 has a reduced diameter cross section and has a frusto-conical shaped outer end portion 22. Adjacent the end portion 22 is a die member 14 which is also arranged detachably in a die holder 14' which is, in turn, detachably held within the housing 12 of the extrusion apparatus.

Mounted detachably and therefore easily exchangeably between the die 14 and die holder 14', on one hand, and the end 22 of the core 10, on the other hand, is a throttling member 15 which is constructed in accordance with the principles of the present invention. The throttling member 15 is in the shape of an annular disc having one face thereof adjacent the supply chamber 13. This face of the throttling member 15 is formed with a plurality of circumferentially spaced grooves or passageways 16 which can best be seen in FIGURES 2 and 3. In FIGURE 2, for example, it can be noted that the cross section of the grooves 16 varies about the circumference of the throttling member 15.

In FIGURE 1 it can be seen that this face of the annular disc shaped member 15 is further formed to provide an antechamber 17 between this face of the member 15 and the frusto-conical surface end portion 22 of the core 10. As the core 10 cooperates with the throttling member 15 and the die 14 it is apparent that the outer surface portion 19 of the core member 10 engages the portions of the member 15 between the grooves 16 so that passageways are formed which permit the extruded material to flow from the supply chamber 13 into the antechamber 17 before the material flows out through the die 14.

In operation, the material to be extruded is introduced into the supply chamber 13 under a very high pressure. The inlet to the supply chamber 13 which is shown by the dotted line 12' may be arranged vertically above the core 10. The cable to be coated is placed within the hollow core means 10 and moved in the direction of the arrow through the extrusion apparatus by moving means not illustrated and which are otherwise conventional.

Due to the high pressure of the material introduced into the supply chamber, the material tends to flow along the path which offers the least resistance. It is clear that such path in the present case where the different grooves 16 have cross-sections differing from each other, would be the wider grooves 16 between the supply chamber 13 and the antechamber 17, since, as can be seen in FIGURE 2, the uppermost passageway 16 has the smallest cross section relative to the direction of flow of the extruded material. Accordingly the material under pressure will be forced around the tubular core member 10 and at different speeds through the various passageways which are circumferentially spaced about the throttling member 15. It is evident that the narrower grooves or passageways 16 have a greater throttling effect than the wider ones which are located where the flow path is the longest. In this manner both pressures and velocities existing in the divided streams of metal flowing through the different grooves 16 is effectively equalized. The extruded material that has been transmitted through the passageways 16 reunites in the antechamber 17 just prior to being forced through the annular gap between the core member 10 and the extrusion die 14. It is apparent that in the antechamber 17 the reunited material has uniform pressure and flow characteristics so that as the material is forced through the die onto the cable issuing from the core member 10, the sheath that is applied about the cable has a uniform thickness around the entire circumference of the cable.

For most advantageous results it is desired to have the largest cross section passageway in that region where the flow path of the extruded material is the longest and the smallest cross section passageway in that region wherein the flow path is the shortest.

The structure shown in the drawings has been used for covering cables with aluminum sheaths and it has been found that continuous sheaths are provided which do not have any defects in the outer surface thereof. For example, in conventional apparatus as the material from consecutive billets is formed about the cable there is a tendency to have a plurality of joints between the material that has just been formed on the cable from one billet and the material then formed about the cable from the following billet. Such joints do not appear when the illustrated structure is used.

It is apparent that the throttling member 15 and the die member 14 may be made of one continuous structure. However, when different diameter cables or coverings are to be handled, and for different pressures and the like, as for instance, if once lead is extruded, and at another time aluminum is used, it is necessary and desirable to be able to quickly change the throttling member 15. If the throttling member 15 is made separately and is held by the die and die holder (14, 14') as illustrated this can be most easily accomplished by using the same core member 10 and any suitable die member 14.

It will be understood that each of the elements described above, or two or more together, may also find a useful application in other types of material forming apparatus differing from the types described above.

While the invention has been illustrated and described as embodied in an extrusion apparatus for covering cables, it is not intended to be limited to the details shown, since various modifications and structural changes may be made without departing in any way from the spirit of the present invention.

What is claimed as new and desired to be secured by Letters Patent is:

1. In an extrusion apparatus for sheathing a cable core, in combination, a housing having a longitudinal axis and a substantially concentric supply chamber with a lateral inlet opening adapted to be connected to a source of material to be extruded along a predetermined path in said housing; tubular core means for feeding a cable supplied through said tubular core means into said supply chamber, said tubular core means being arranged concentrically in said housing so as to project with its forward end portion into said supply chamber and so that said material when forced into said chamber flows around said end portion of said core means; die holder means detachably arranged in said housing coaxially therewith and in forward direction from and opposite said core means; extruding die means having a central die opening and being arranged concentrically and detachably in said die holder means along said path; and an annular disc-shaped throttling member arranged concentrically and detachably in said housing and fixedly held between said die and die holder means and said end portion of said core means and having a face directed towards said supply chamber and abutting against said forward end portion of said core member, said face being formed with a central opening being at least as large as said die opening and with a plurality of circumferentially spaced radial grooves therein which form together with the respectively adjacent surface portions of said end portion of said core means a plurality of passageways along said predetermined path for the material for controlling the flow of the material being extruded and for providing a throttling effect on the material flowing about said core means and toward said die means, the cross-section areas of said passageways differing respectively in such a manner that the cross-section area is the greatest where the flow path from said inlet to said die means is the longest, and is the smallest where said flow path is the shortest, said face of said throttling member being shaped to form with said end portion of said core means an antechamber extending from said central opening in radial direction to the inner ends of said radial grooves and communicating therewith, for said material to be reunited in said antechamber after flowing through said separate passageways and prior to its passage through said die means.

2. An extrusion apparatus as set forth in claim 1, wherein the flow-determining cross-sectional area of said antechamber is larger than the sum of all the cross-sectional areas of said passageways.

References Cited in the file of this patent

UNITED STATES PATENTS

| | | |
|---|---|---|
| 346,563 | Robertson | Aug. 3, 1886 |
| 408,375 | Cobb | Aug. 6, 1889 |
| 867,658 | Hoopes et al. | Oct. 8, 1907 |
| 1,978,976 | Zapf | Oct. 30, 1934 |
| 2,673,645 | Moczik | Mar. 30, 1954 |
| 2,674,373 | Latin | Apr. 6, 1954 |

FOREIGN PATENTS

| | | |
|---|---|---|
| 166,915 | Great Britain | July 14, 1921 |